United States Patent [19]

Storm et al.

[11] Patent Number: 5,360,963
[45] Date of Patent: Nov. 1, 1994

[54] APPARATUS FOR AND METHOD OF INDUCTION-HARDENING MACHINE COMPONENTS

[75] Inventors: John M. Storm, Danville; Michael R. Chaplin, Speedway, both of Ind.

[73] Assignee: Contour Hardening, Inc., Indianapolis, Ind.

[21] Appl. No.: 14,667

[22] Filed: Feb. 8, 1993

Related U.S. Application Data

[60] Continuation-in-part of Ser. No. 839,333, Feb. 20, 1992, Pat. No. 5,247,150, and a continuation-in-part of Ser. No. 839,332, Feb. 20, 1992, Pat. No. 5,247,145, which is a continuation of Ser. No. 708,896, May 31, 1991, Pat. No. 5,124,517, said Ser. No. 839,333, is a division of Ser. No. 708,896, May 31, 1991.

[51] Int. Cl.$^5$ ............................. H05B 6/40; H05B 6/14
[52] U.S. Cl. ..................................... 219/640; 219/652; 219/672; 148/573; 266/129
[58] Field of Search ............ 219/10.43, 10.41, 10.59, 219/10.57, 10.67, 10.79, 640, 641, 635, 652, 672, 658, 676, 674; 266/127, 129; 148/575, 574, 573, 576, 567

[56] References Cited

U.S. PATENT DOCUMENTS

| | | | |
|---|---|---|---|
| 2,857,154 | 10/1958 | Jones | 266/125 |
| 3,081,989 | 3/1963 | McBrien | 266/129 |
| 3,196,244 | 7/1965 | Wulf | 148/147 |
| 4,357,512 | 11/1982 | Nishimoto et al. | 219/10.79 |
| 4,401,485 | 8/1983 | Novorsky | 219/10.57 |
| 4,637,844 | 1/1987 | Pfaffmann | 148/575 |
| 4,675,488 | 6/1987 | Mucha et al. | 219/10.43 |
| 4,749,834 | 6/1988 | Mucha et al. | 219/10.43 |
| 4,757,170 | 7/1988 | Mucha et al. | 219/10.43 |
| 4,785,147 | 11/1988 | Mucha et al. | 219/10.59 |
| 4,845,328 | 7/1989 | Storm et al. | 219/10.59 |
| 4,855,551 | 8/1989 | Mucha et al. | 219/10.43 |
| 4,855,556 | 8/1989 | Mucha et al. | 219/10.43 |
| 5,124,517 | 6/1992 | Storm et al. | 219/10.59 |
| 5,247,150 | 9/1993 | Storm et al. | 219/10.59 |

OTHER PUBLICATIONS

Induction Gear Hardening by the Dual Frequency Method, *Heat Treating* magazine, vol. 19, No. 6, Jun. 1987.

*Primary Examiner*—Philip H. Leung
*Attorney, Agent, or Firm*—Woodard, Emhardt, Naughton, Moriarty & McNett

[57] ABSTRACT

An induction-hardening machine for the contour hardening of cross-axis, intersecting-axis and nonintersecting-axis gears such as hypoid gears includes a programmable logic control unit, a source of quench liquid and a high-frequency induction generator which are operably connected to a high-frequency induction coil which, in one embodiment, is disposed at an inclined angle above the horizontally disposed workpiece (hypoid gear). Fluid connections are made between the source of quench liquid and the induction coil for the rapid delivery of quench liquid. The support platform for the hypoid gear is connected to a rotary drive motor and with the hypoid gear rotating at approximately 900 to 1800 RPM the induction coil is energized with four low energy pulses of relatively short duration. The final heating step is a high energy pulse followed immediately by the quenching step. In one embodiment the induction coil is also offset from the geometric center of the gear and it is this offset and the inclined angle of the induction coil which address the heel to toe tooth differences and the spiral configuration of a hypoid gear.

2 Claims, 5 Drawing Sheets

APPARATUS FOR AND METHOD OF INDUCTION-HARDENING MACHINE COMPONENTS

REFERENCE TO RELATED APPLICATIONS

The present application is a continuation-in-part application of Ser. Nos. 07/839,333, U.S. Pat. No. 5,247,150 and 07/839,332, U.S. Pat. No. 5,247,145 which were filed Feb. 20, 1992, Ser. No. 07/839,333 is a divisional patent application and Ser. No. 07/839,332 is a continuation patent application of Ser. No. 07/708,896, filed May 31, 1991, now U.S. Pat. No. 5,124,517, issued Jun. 23, 1992.

BACKGROUND OF THE INVENTION

The present invention relates generally to the technology of induction heating and more particularly to the use of induction heating for case-hardening of machine components such as gears.

Machine components such as gears, splined shafts and sprockets are frequently subjected to high torque loads, frictional wear and impact loading. The gears in a power transmission, for example, will encounter each of these forces during normal operation. In the typical gear production facility, the machining of gear teeth is followed by heat treatment to harden them. Heat-treating gears can involve many different types of operations, all of which have the common purpose or singular objective of producing a microstructure with certain optimum properties. The hardening process, however, often distorts the gear teeth resulting in reduced and variable quality.

In order to avoid these problems associated with conventional heat-treating and to improve the ability of the machine component (gear) to withstand the aforementioned loads and wear forces, the base metal is given a hardened outer case by selective hardening. In this manner, it is only the outer surface which is altered and the base metal retains its desirable properties such as strength and ductility.

One technique for the selective hardening of this outer case on such machine components as gears is to induction-harden the gear teeth individually. Another hardening technique which is also selective is a process referred to as selective carburizing. Single-tooth induction hardening is performed with a shaped intensifier that oscillates back and forth in the gear tooth space. This is usually done with the gear submerged in the quench. The process is relatively slow because only one gear tooth is processed at a time. Selective carburizing is most widely used and the process involves covering the surfaces to be protected against carburizing with a material that prevents the passage of active carbon during the furnace operation. The most widely used method to stop carbon activity is copper plating. A gear is copper plated on all surfaces except the teeth, then carburized. The part is then copper stripped, finish machined, re-copper plated all over, furnace-hardened, and quenched.

The difficulties and expense of the carburizing process have prompted companies to consider alternative techniques such as induction heating for selective case hardening, but to do so on a larger scale as opposed to the single-tooth method. U.S. Pat. No. 4,675,488, which issued Jun. 23, 1987, to Mucha et al., discloses a variation on the single-tooth process described above, wherein the process involves inductively heating and then quench-hardening a few teeth at a time while the rest of the teeth are cooled for the purpose of preventing drawback of previously hardened teeth (column 1, lines 55–65). While all of the teeth are ultimately induction-hardened, the inductors are extremely complex and expensive. The Mucha et al. patent also mentions the attempt by others for several years to devise a means for induction hardening the outer peripheral surfaces of gears by using an encircling inductor so that the gears can be treated by the inductor and then quench-hardened immediately thereafter in order to create the desired case hardening on the outer surface of the gear. The solution suggested by the Mucha et al. patent is to provide two induction heating coils with the workpiece located concentric in the first induction heating coil. The first coil is energized with tile first alternating frequency current for a fixed period of time. Once deenergized, the workpiece experiences a time delay period and thereafter the first induction heating coil is reenergized with a second alternating frequency for another fixed period of time, though substantially less than the first period of time with the first alternating frequency. At the end of this second period of time, the workpiece is immediately transferred into the second induction heating coil in a concentric manner and experiences a second time delay. Following this step, the second induction heating coil is energized with a radio frequency current for a third time period and immediately quenching the outer surfaces by quenching liquid sprayed against the surfaces while the workpiece is in the second induction heating coil.

Several years ago, a dual-frequency arrangement for induction heating was described wherein a low-frequency current would be used for preheating the gear teeth and then a high-frequency (radio frequency) current could be used for final heating prior to quench hardening. This dual-frequency arrangement is employed to some extent by the Mucha et al. patent which is described above. This dual-frequency concept was also described by the present inventors in their article entitled "Induction Gear Hardening by the Dual Frequency Method" which appeared in Heat Treating magazine, Volume 19, No. 6, published in June, 1987. As they explain in their article, the principle of dual-frequency heating employs both high- and low-frequency heat sources. The gear is first heated with a relatively low-frequency source (3–10 kHz), providing the energy required to preheat the mass of the gear teeth. This step is followed immediately by heating with a high-frequency source which will range from 100–300 kHz depending on the gear size and diametral pitch. The high-frequency source will rapidly final heat the entire tooth contour surface to a hardening temperature. The gear is then quenched to a desired hardness and tempered.

Dual-frequency heating is the fastest known way of heating a gear. Heating times range from 0.14 to 2.0 seconds. This compares, for example, with 4–30 minutes required for a laser to scan a gear, tooth by tooth. In dual-frequency heating, the spinning workpiece is preheated while riding on a spindle centering fixture. Then a quick "pulse" achieves optimum final heat. Next the piece indexes into a water-based quench, for a total process time of approximately 15 to 30 seconds. Dual frequency is unique among gear-hardening methods in that it allows competing specifications to coexist. That is, for a given case depth requirement and distortion limitation, with conventional hardening methods one requirement tends to consume the other. Because dual-frequency hardening puts only the necessary amount of heat into the part (½ to 1/10 of the energy used in conventional induction), case depth requirements and gear geometry specifications can both be met, precisely.

With any induction heating process whether dual- or single-frequency, and regardless of the type of part and its material, the part characteristics dictate the optimum design of both the induction heating coil or coils and the most appropriate machine settings. Only with the properly designed coil and the appropriate machine setting is it possible to achieve the contour and case hardening specifications deemed to be the most appropriate from the standpoint of wear and load resistance while still retaining overall part strength, material ductility and part specifications. A gear which is too brittle will fail prematurely, often by a tooth cracking or breaking of the gear blank body.

Other patents which are known to exist that relate generally to induction hardening include the following:

| U.S. Pat. No. | Patentee | Dated Issued |
| --- | --- | --- |
| 4,749,834 | Mucha et al. | Jun. 7, 1988 |
| 4,757,170 | Mucha et al. | Jul. 12, 1988 |
| 4,785,147 | Mucha et al. | Nov. 15, 1988 |
| 4,855,551 | Mucha et al. | Aug. 8, 1989 |
| 4,855,556 | Mucha et al. | Aug. 8, 1989 |

U.S. Pat. No. 4,749,834 discloses a method of hardening the radially, outwardly facing surfaces of a generally circular, toothed workpiece adapted to rotate about a central axis generally concentric with the outwardly facing surfaces whereby the extremities of the surfaces define an outer circle by the tips of the teeth of the workpiece. This workpiece is typically a gear and as illustrated in the various drawings is a gear of uniform tooth configuration.

U.S. Pat. No. 4,757,170 discloses a method and apparatus for progressively hardening an elongated workpiece having an outer generally cylindrical surface concentric with the central axis including the concept of providing closely spaced first and second induction heating coils each having workpiece receiving openings generally concentric with the axis of the workpiece. While this is a scanning type of system noting the rack and pinion drive of FIG. 1, it is also to be noted that the illustrated workpiece is a gear having uniform teeth.

U.S. Pat. No. 4,785,147 discloses an apparatus for hardening the outwardly facing teeth surfaces of a gear and is a continuation of a prior application which is now U.S. Pat. No. 4,749,834 and as such the disclosure and relevance is believed to be the same.

U.S. Pat. No. 4,855,551 discloses a method and apparatus for hardening the outwardly facing teeth surfaces of a gear. This patent is a continuation of a prior case which is now U.S. Pat. No. 4,785,147 and thus would have a description comparable to that prior listed patent.

U.S. Pat. No. 4,855,556 discloses a method and apparatus for progressively hardening an elongated workpiece having an outer generally cylindrical surface concentric with the central axis. This patent is a continuation of prior patent U.S. Pat. No. 4,757,170 and thus the disclosure would correspond with the disclosure of that earlier case.

It is believed that each of these foregoing five references do not relate in any way to induction hardening of gear teeth with a non-uniform geometry, namely one where the mass of each tooth varies from the heel to toe. Consequently, these five references are believed to have very limited, if any, relevancy to the present invention.

Traditionally, a fixed coil design has been used for a wide range of different parts and machine settings were made on a "best guess" basis by the induction machine operator. By fixing the coil, one variable is eliminated and the operator attempts to zero in on an acceptable final part by trial and error procedures. The more experienced the operator, hopefully the greater the number and variety of parts he will have experienced and to the extent that he is able to draw on that experience, he may be able to come close to an acceptable part, but only after repeated attempts.

Since this entire approach is not scientific, the best one can hope for is to reach an acceptable part but not an optimum part. This problem is magnified when applying induction heating to irregularly shaped objects such as gears. Heretofore, there has been no attempt to try and derive a set of formulae to precisely determine the most optimal coil specifications and induction machine settings for a given part and which is repeatable, part after part, regardless of the size, shape, material or other characteristics. Instead, gross parameters are selected for the coil based on general part size and then machine settings manipulated until the combination of variables comes close to something that can be accepted.

In order to avoid the uncertainty in coil specifications and machine settings and to enable induction hardening in a precise and optimum manner regardless of the type of machine component part or part geometry and features, the present inventors conceived the invention which is disclosed and claimed in U.S. Pat. No. 4,845,328 which patent is expressly incorporated herein by reference for the entirety of its disclosure. U.S. Pat. No. 4,845,328 discloses a machine structure and a method of induction hardening using a series of formulae for establishing coil specifications and machine settings which formulae are based on the component part size and features. This process of scientifically calculating the specifications for a unique coil and the machine variables (settings) based on individual part characteristics enables predictable and uniform results for the induction hardening of the part in an orderly and repeatable fashion.

Previously, any calculating which may have been done was rudimentary at best, based only on surface area and depth of penetration. The series of formulae of U.S. Pat. No. 4,845,328 allow the coil and machine variables to be set scientifically rather than by guesswork and the needless trial and error attempts are eliminated while at the same time improving part quality from merely an acceptable or tolerable level to an optimum level.

More specifically the U.S. Pat. No. 4,845,328 patent focuses on formulae and solutions for the induction hardening of parallel axis gearing. With constant tooth sizes for a given application, the formulae produce solutions for complete heating parameters. Other types or shapes of gears such as cross-axis, intersecting-axis and nonintersecting-axis (hypoid) gears do not have constant tooth sizes and therefore, do not follow the formulae.

In the prior patent of the present inventors the mathematical algorithm uses gear parameters such as diametral pitch. The process also relies on the size uniformity of each tooth from heel to toe. The positioning of the workpiece within the induction coils and the uniformity of the heating pattern across and through the workpiece from the inside diameter to the outside diameter reflects the fact of tooth size uniformity. While the induction hardening of parallel axis gearing has been quite successful with this prior invention and the method and machine of the U.S. Pat. No. 4,845,328, cross-axis, intersecting-axis and nonintersecting-axis gearing were discovered to create a unique situation due to the changing (increasing) mass of the gear teeth from toe to heel. As one example, hypoid gears which are found in any rear or four wheel drive car or truck possess a non-uniform heel to toe tooth geometry. In addition to the spiral type curvature to the individual teeth, there is more mass to each tooth moving outwardly from the toe to the heel. The present inventors addressed the unique situation of hypoid gears (and related cross-axis, intersecting-axis and nonintersecting-axis gearing) in U.S. Pat. No. 5,124,517, issued Jun. 23, 1992 to Storm, et al.

It has also been discovered that certain production considerations as well as certain hypoid gear geometries might warrant a different induction coil design and a slightly different positioning of the coil relative to the gear. For example, when there is a smaller than normal face (or cone) angle to the gear, a conical induction coil centered over tile workpiece may be more suitable than a generally cylindrical induction coil set at an inclined angle. For larger gears and for large quantity production runs it might be preferred to have a coil with a fixed angle of incline as contrasted to a variable mechanical attachment for the coil which fixes the induction coil at a desired angle of incline relative to the tooth surface of the workpiece. Regardless of the specific coil design or geometry or positioning relative to the workpiece, the objective of the present invention is to configure the coil so that the magnetic coupling, and thus heat, is higher at the heel of the gear where the metal mass is greater than at the toe of the gear where the metal mass is smaller.

SUMMARY OF THE INVENTION

An induction hardening machine for the contour hardening of cross-axis, intersecting-axis and nonintersecting-axis gears according to one embodiment of the present invention comprises a work station support having support means designed and arranged for receiving a gear to be induction hardened and further including a rotatable drive spindle secured to the support means, the drive spindle having a geometric axis of rotation, a high frequency induction coil having a generally conical, gear-facing surface and a geometric axis centerline, the coil being positioned above the work station support and oriented such that the axial centerline is generally coincident with the geometric axis of rotation of the drive spindle and energizing means electrically connected to the high frequency induction coil for energizing the coil.

One object of the present invention is to provide an improved method of induction hardening of cross-axis, intersecting-axis and nonintersecting-axis gears.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
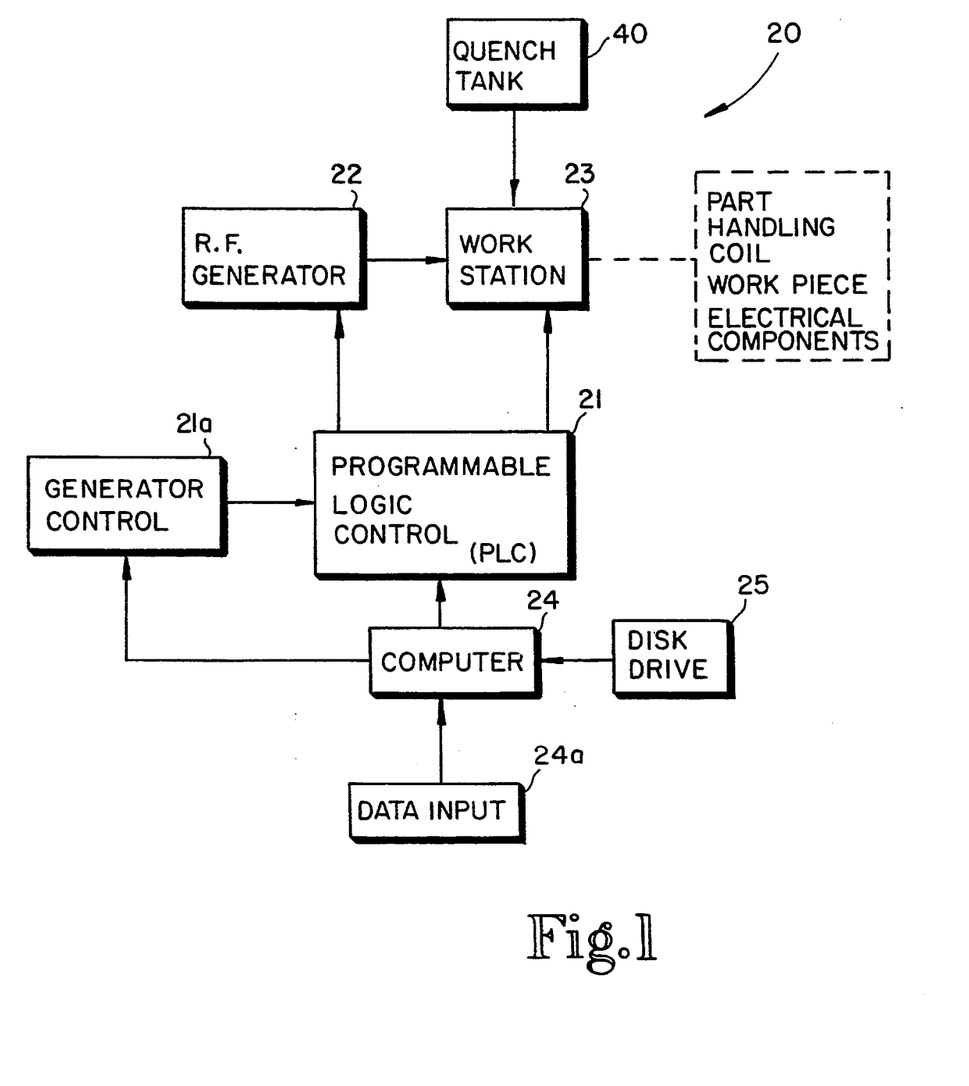
FIG. 1 is a block diagram of the main components of an induction hardening machine for use in induction hardening gears according to a typical embodiment of the present invention.

Referring to FIG. 1, there is schematically or diagrammatically illustrated a block diagram of the main components and connections of an induction hardening machine 20 for cross-axis, intersecting-axis and nonintersecting-axis gearing, such as hypoid gears. Hereinafter reference to a hypoid gear is intended to represent only one example of the three categories of gearing to which this invention is primarily directed. No limitation to the broader scope and applicability of the invention is intended by this singular representative example. Machine 20 includes a programmable logic control (PLC) unit 21, high frequency (R.F.) generator 22 and work station 23. The PLC unit is driven by a computer 24 and disk drive 25 arrangement with the connections being made and intelligence transferred as illustrated. Data input may also be provided by block 24a which could be a manual entry of data for example. This data entry could be in addition to the disk drive data or in lieu of the disk drive input. The broken line box connected to the work station is intended to illustrate the structural aspect of and components positioned at the work station. As noted, the work station includes induction coil 26, hypoid gear (workpiece) 27, support plate 28, drive spindle 29 and drive motor 30 (see FIG. 2).

One option for the generator control circuitry is represented by block 21a which is structured in accordance with the disclosure of U.S. patent application Ser. No. 563,398, filed on Aug. 6, 1990. This patent application is hereby expressly incorporated by reference for the entirety of its disclosure. As illustrated, the generator control circuitry receives a signal input from computer 24.

Figure 2:
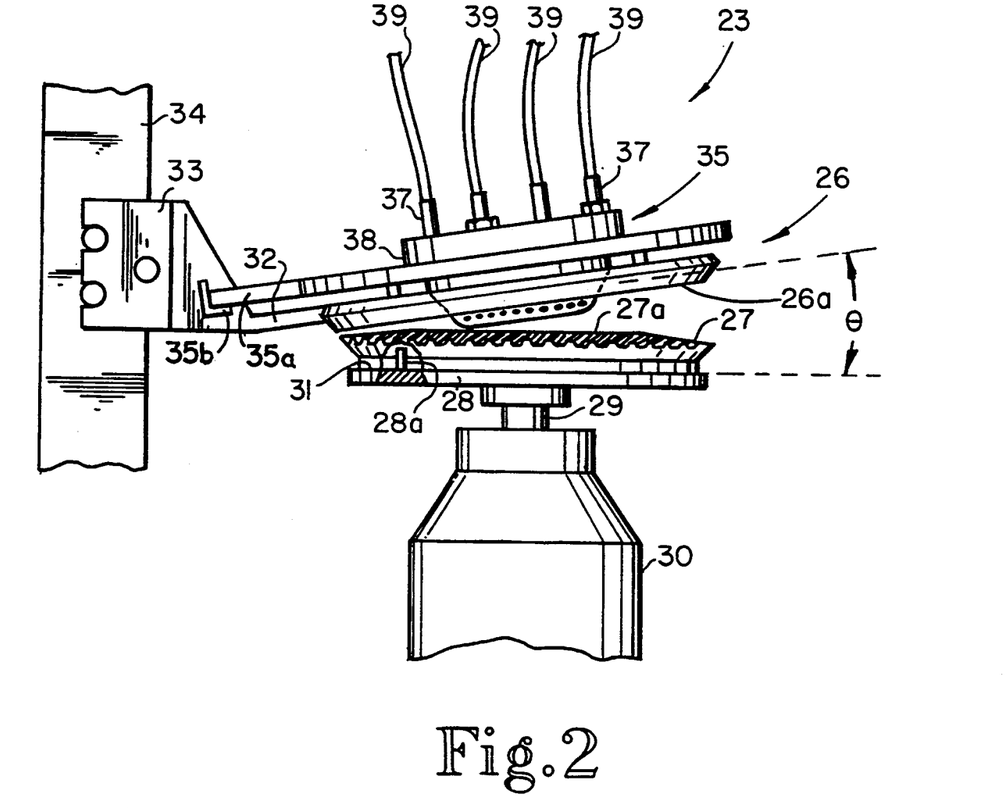
FIG. 2 is a front elevational view of the work station portion of the FIG. 1 induction hardening machine.

As illustrated in FIG. 2 the workpiece in the preferred embodiment is a hypoid gear 27 which is positioned on support plate 28. Hypoid gear 27 is representative of one type of bevel gear and the present invention is thus applicable for bevel gears generally. Spindle 29 which is centrally connected to the underside of support plate 28 couples directly to rotary drive motor 30. Hypoid gear 27 includes a predrilled hole in its substantially flat bottom face. Gear 27 has a top surface 27a which is substantially horizontal as mounted to plate 28 and surface 27a corresponds to the inner most portion of the tip of the gear. A rigid and fixed positioning pin 28a is assembled as part of support plate 28 and extends upwardly from the top surface 31. The gear is securely assembled to the support plate by locating the positioning pin into the predrilled hole. When the rotary drive motor 30 is energized it rotates the spindle at a high rate of speed which in turn rotates the support plate and the hypoid gear. The speed of rotation is approximately 900–1800 RPM and a suitable component for rotary drive motor 30 is a Setco bottom drive, model no. SPL 6100.5-18M.

Figure 2A:
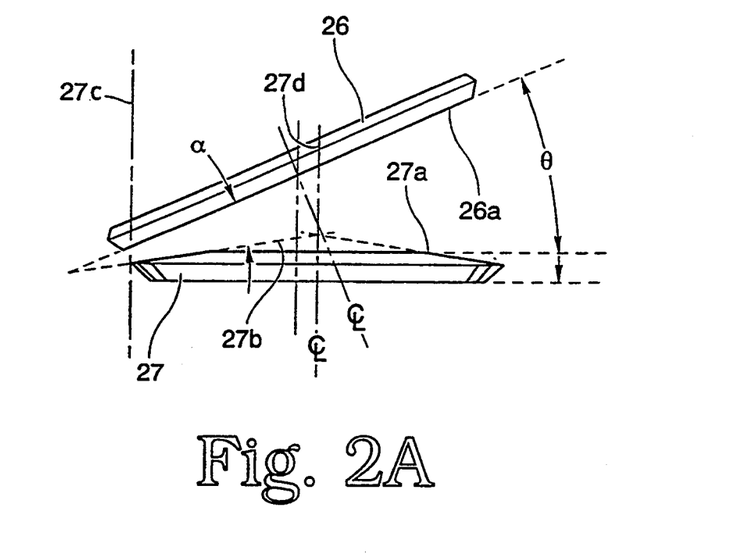
FIG. 2A is a diagrammatic front elevational view illustrating the angle of incline of the coil relative to the angle of the gear tooth top surface.
Figure 3:
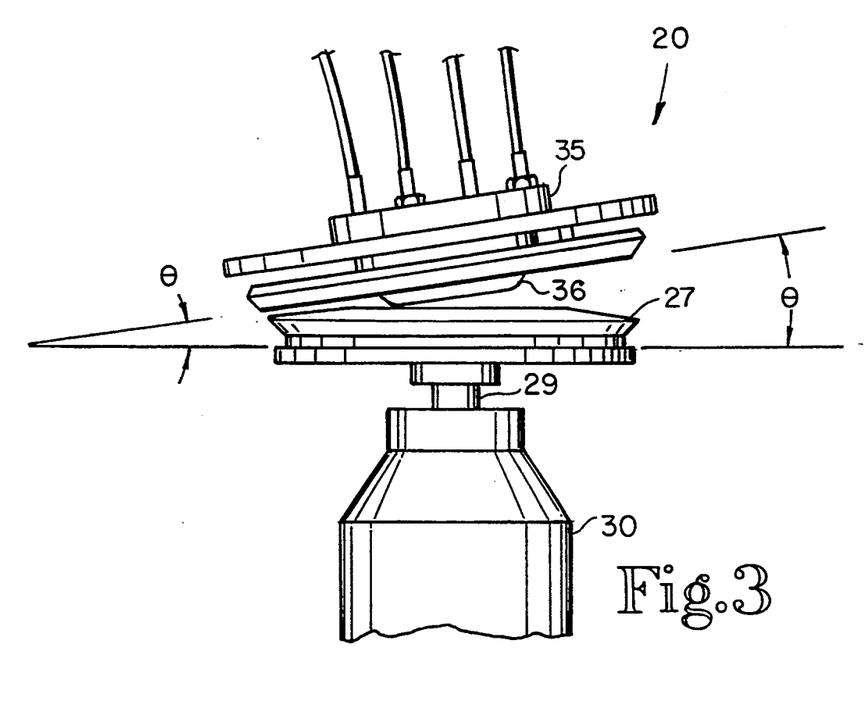
FIG. 3 is a diagrammatic front elevational view illustrating the offset of the induction coil relative to the gear.

The rotary motion imparted to the hypoid gear workpiece is one aspect of the design of induction hardening machine 20 as a means of averaging out any slight positional variations. Another aspect of induction hardening machine 20 is the positioning of the induction coil relative to the hypoid gear 27. As is illustrated in FIGS. 2, 2A and 3, the top surface 27a of gear 27 is substantially horizontal as is the top surface of support plate 28. However, gear 27 has a face angle which creates the tooth surface angularity along line 27b (see FIG. 2A), and thus it is only the upper and innermost edges of the gear teeth which contact or create top surface 27a. As used herein the face angle is the acute included angle between line 27b and vertical line 27c. The cone angle which is equal to the face angle is the included angle between line 27b and vertical centerline 27d. In the FIG. 2A arrangement, as described, the coil is placed at an angle and is eccentric to the workpiece (gear). This causes heating of the gear to occur on only a small sector of the gear. Consequently, high speed rotation is necessary to even out the heating throughout the gear. Since magnetic coupling via the coil is only on a sector of the gear, the gear size that can be induction hardened by this approach is limited if one wishes to achieve near optimal induction hardening results.

The inclined angle theta places the induction coil closer to the heel of the gear and farther apart from the toe on the one side where the coil is closest. This creates acute angle alpha which is defined by the lower surface 26a of the coil and the gear tooth surface which defines the cone angle of the gear face and which is coincident with line 27b. The heel represents the greater mass portion of the gear tooth, and induction heating begins at this point due to the proximity of the coil. The heel heat is transferred to the toe as the coil additionally heats up the toe while the heel continues to be heated. Without the coil disposed at an angle, the toe portion becomes too hot while the greater mass of the heel portion is still in the process of heating up to the desired temperature. The angle alpha which is in effect created by selection of angle theta, is selected so that the magnetic coupling, and thus heat, is higher at the heel where the metal mass is larger than at the toe of the gear where the metal mass is smaller.

Several gear geometry factors may have a bearing on the optimal incline for angle alpha. These factors would include, for example, the gear cone angle and the gear spiral angle, but ultimately it is the rate of change in tooth mass from the heel to the toe which dictates the angle of incline and angle alpha. The focus of FIG. 2 is directed more to the mechanical aspects of positioning and support while FIGS. 2A and 3 focus on the positional geometries and relationships.

Figure 4:
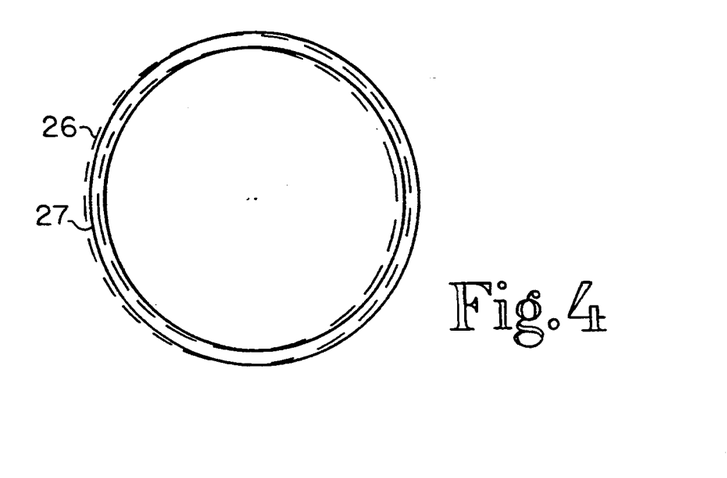
FIG. 4 is a diagrammatic top plan view illustrating the offset of the induction coil relative to the gear.

In FIGS. 2A and 4 the offset of the coil 26 relative to the gear 27 is illustrated. The slight shift combined with high speed rotation of the gear provides uniformity to the induction heating process and a guarantee that the entirety of each tooth will be correctly heated by the induction process. The air gap between the induction coil 26 and the face of the hypoid gear ranges from approximately 0.10 inches at the heel of the gear to approximately 0.90 inches at the toe of the gear. Induction coil 26 which has a substantially cylindrical, annular ring shape is skewed or shifted to one side of center of the hypoid gear 27. This shift to one side of center is diagrammatically illustrated by the front elevational view of FIG. 2A and the top plan view of FIG. 4.

A quench assembly 35 is securely assembled to the induction coil 26 and this combination, by way of extension arm 32 and support clamp 33 is securely attached to support column 34. Arm 32 is securely joined as an extension of the induction coil and is fixed to clamp 33 in order to orient tile coil in the desired position and inclination relative to hypoid gear 27. Plastic ring 35a fastens to L-bracket 35b which in turn is secured to clamp 33. This ring provides additional rigidity to the coil and quench assembly combination. With the hypoid gear properly positioned and pinned to support plate 28 and with the induction coil 26 securely clamped in position and set at the desired orientation and inclination, the induction hardening process is ready to be run.

The first step in the induction hardening process is to energize drive motor 30 in order to initiate high speed rotation of hypoid gear 27. As one example of relative figures for a certain size gear and Kw generator, the rotation speed is 900 to 1800 RPM. Heating of the example gear by the induction coil 26 begins with four high frequency, low power pulses from RF generator 22. Generator 22 is a 650 kilowatt unit operating between 230 and 280 kilohertz. The four low power pulses are run at 30 percent of the 650 kilowatt rated level. The first pulse has a duration of four seconds followed by a two second dwell between the first and second pulses. The second pulse has a duration of five seconds followed by another two second dwell between the second and third pulses. The third and fourth pulses are each six seconds in duration, spaced by a third, two second dwell interval.

Following the fourth low power pulse there is an eight second dwell before a single high power pulse is delivered as the final heating pulse. The power level of this final heating pulse is set at 79 percent of the 650 kilowatt rated level of the RF generator. This final pulse has a duration of approximately 2.65 seconds and it is followed immediately (no dwell or delay) by quench initiation.

The quench liquid is delivered to the hypoid gear 27 by a liquid delivery system (quench assembly 35) built in cooperation with the induction coil. The quench assembly 35 is assembled to the induction coil and a portion of the quench assembly is disposed above the coil while a domed portion 36 extends through the center of the coil. Four fluid fittings 37 are assembled into the top manifold 38 of the quench assembly 35. Internal passageways enable the quench liquid to pass from these four fittings to the domed portion of the assembly where a series of fluid outlets (holes) are positioned directly above and are pointed directed at the face of the hypoid gear 27. The complete and rapid quench is enabled by the domed portion 36 of the quench assembly 35. This domed portion has both the circular shape and angularity to direct a large number of liquid outlets at all surfaces of the gear teeth. Although the domed portion is also set at an angle relative to the gear, the low speed rotation of the gear even during the quench cycle provides quench uniformity to all of the gear teeth.

Four fluid delivery hoses 39 connect quench tank 40 (see FIG. 1) with fittings 37. The four delivery hoses are each one inch lines and the quench tank has a 150 gallon capacity. A suitable quench medium for this application is an E. F. Houghton 364 aqua quench, which is a glycol solution of between 5 and 10 percent.

Throughout the low power heating and high power heating the vertical position of the hypoid gear relative to the induction coil remains the same. During quench there may be a slight vertical axis travel of the hypoid gear relative to the induction coil to facilitate quench. When the quench phase is completed the part is removed from the support plate and the machine is reset and ready for the next hypoid gear. The PLC unit 21 controls the high frequency generator 22 and quench fluid supply and delivery timing. A console provides all the necessary operator controls and data entry for operation of the PLC unit though with computer control there is minimal operator interfacing. The PLC unit controls the delivery of the requisite power pulses, the power level and the duration. The number of low power pulses is also selected either by the operator via the console or by the computer program, based on gear parameters, for control of what the induction coil delivers.

Figure 5:
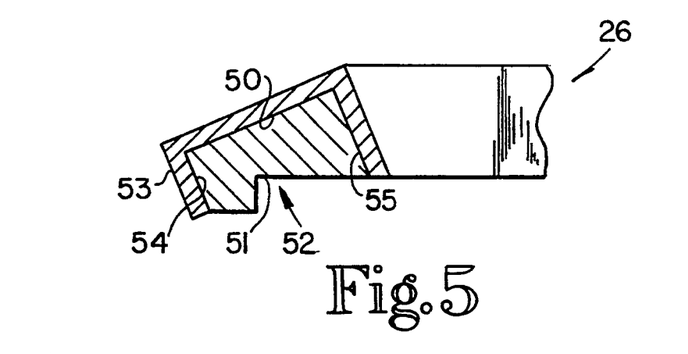
FIG. 5 is a partial, diagrammatic illustration of the FIG. 3 coil in full section.

Referring to FIG. 5 the cross section of one side of the induction coil 26 is illustrated. The coil 26 is generally cylindrical but includes an angled upper face 50 and stepped surface 51 on the underside 52. A flux concentrator layer 53 is disposed over the angled upper face 50 as well as over the outside surface 54 and inside surface 55 of coil 26. This flux concentrator is made of powdered iron suspended in plastic.

Figure 6:
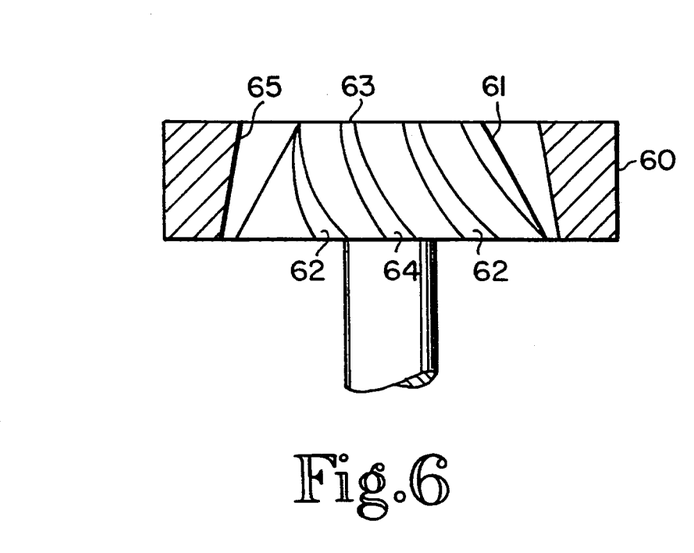
FIG. 6 is a diagrammatic front elevational view of an alternate induction hardening coil to be used for a pinion gear according to the present invention.

Referring to FIG. 6 an alternate induction coil 60 and pinion gear 61 are illustrated. A pinion gear is a unique situation to the larger ring gear of FIGS. 2 and 3 in that the non-uniform gear teeth which have a varying mass from one end of the teeth to the opposite end, extend down the sides as opposed to across the top surface. Consequently, for a pinion the induction coil needs to be positioned around the gear as compared to over the gear.

Pinion 61 has curved (spiral) teeth 62 with an increasing tooth mass from the toe 63 (top) to the heel 64 (base). Consequently, in accordance with the present invention the inner surface 65 of the induction coil 60 is tapered so that the coil is closer to the larger mass of the gear tooth at the heel and farther away at the toe. The pinion 61 is rotated at a high speed and the coil height extends the full height of the gear teeth. The remainder of the design and operation of the structure of FIG. 1 is applicable to the coil and gear configuration of FIG. 6 in virtually the same manner and fashion as that for the configuration of FIG. 2. The only real difference between the FIG. 2 and FIG. 6 alternatives in addition to the style and placement of the induction coil is the positioning of the quench assembly relative of the coil Since the pinion is positioned inside the coil in FIG. 6 configuration, the quench assembly must be disposed above and around the pinion, with the fluid outlets directed at the teeth.

Figure 7:
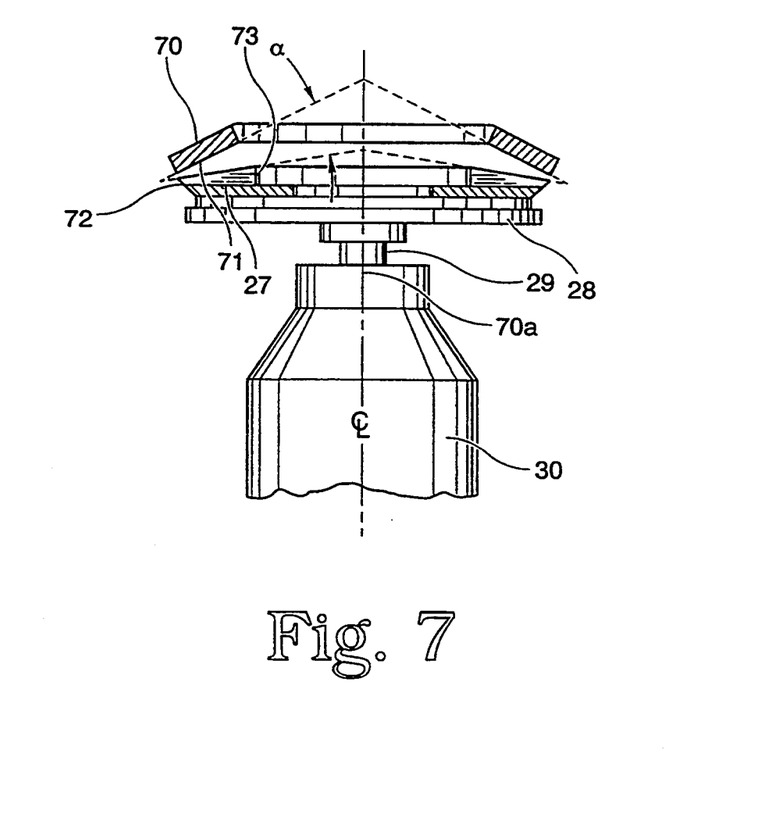
FIG. 7 is a front elevational view in full section of an alternative coil design positioned over a gear according to one embodiment of the present invention.

With reference to the earlier discussions regarding FIG. 2A, now consider FIG. 7 which illustrates a different positional relationship of the coil 70 and workpiece, in this case as well, hypoid gear 27. In this embodiment of the present invention the coil 70 has a generally conical lower face 71 located generally concentric with the gear 27. The illustrated and identified centerline 70a is intended to represent the geometric, axial centerlines of the gear and of the coil. Angle alpha is still maintained as in FIG. 2A so as to vary the magnetic coupling and generate greater heating at the heel 72 where the metal mass is greater as contrasted with the toe 73 of the gear. However, with the generally conical style and concentric orientation of coil 70, heating occurs around the entire gear except for a very small portion adjacent the coil leads. In the FIG. 7 embodiment a lower rotational speed can be used and larger gears can be induction hardened (heat treated) since magnetic coupling is virtually completely around the gear face.

As between the embodiment of FIG. 2A and the embodiment of FIG. 7, one might prefer the FIG. 2A arrangement for laboratory and short run parts because the angle alpha can be easily adjusted. This should be clear from the FIG. 2 mechanical structure which uses arm 32 and clamp 33 in order to secure the coil 26 to the support column 34 by way of the quench assembly 35.

When a large number of parts are to be run, such as a production line quantity, the embodiment of FIG. 7 might be preferred because once the angle alpha is fabricated and fixed into the conical form of the coil, this angle remains fixed and will not change. Consequently, angle alpha cannot be inadvertently changed by operating personnel or carelessly knocked out of position. The FIG. 7 embodiment also provides more efficient magnetic coupling and is preferred for larger gears. While not necessarily a negative, the FIG. 7 embodiment requires a new coil for each different angle alpha which is desired and thus the mechanical fixturing freedom which allows the operator to change the angle alpha is lost.

The FIG. 7 embodiment is also believed to be preferred when the face angle of the gear is relatively small. As the face angle increases experiments have shown that the coil configuration of FIGS. 2, 2A and 3 would be preferred. A likely cross over point between the two embodiments would be a face angle of between 30 and 35 degrees.

As has been explained and described, as the mass of the heel increases relative to the mass of the toe of each gear tooth, the incline coil design of FIGS. 2, 2A and 3 is preferred. As the heel to toe mass displays a greater uniformity, the FIG. 7 embodiment would be preferred. As should be understood, as the face angle increases the mass of the heel relative to the toe also increases and there is then a greater need to concentrate the induction coupling near the heel and to focus or concentrate a greater portion of the heating energy at that point as it will require more than the toe based upon the relative differences in mass.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:
   a bevel gear to be induction hardened having a substantially flat rear face, a plurality of gear teeth, each gear tooth having a heel portion and a toe portion and an upper gear tooth surface defining a cone angle, said bevel gear having an axial centerline; and
   an induction-hardening machine for the contour hardening of said bevel gear comprises:
   a work station support having support means receiving said bevel gear and further including a rotatable drive spindle secured to said support means, spindle drive means connected to said rotatable drive spindle for rotating said drive spindle, said drive spindle having a geometric axis of rotation;
   an induction coil having a generally conical, gear-facing surface and a conical centerline axis, said induction coil being positioned above said work station support and oriented such that said conical centerline axis is generally coincident with the axial centerline of said bevel gear, wherein the gear-facing surface of said induction coil and the gear tooth surface of said bevel gear define therebetween an acute angle; and
   energizing means electrically connected to said induction coil for energizing said induction coil.

2. The combination of claim 1 wherein said induction coil is a high frequency induction coil.

* * * * *

UNITED STATES PATENT AND TRADEMARK OFFICE
CERTIFICATE OF CORRECTION

PATENT NO. : 5,360,963

DATED : November 1, 1994

INVENTOR(S) : John M. Storm, et al

It is certified that error appears in the above-indentified patent and that said Letters Patent is hereby corrected as shown below:

In Col. 2, at line 16, replace "tile" with --the--.

In Col. 5, at line 30, replace "tile" with --the--.

In Col. 8, at line 29, replace "tile" with --the--.

In Col. 10, at line 4, between "coil" and "Since" insert --.--.

Signed and Sealed this

Tenth Day of January, 1995

Attest:

Attesting Officer

BRUCE LEHMAN

Commissioner of Patents and Trademarks